United States Patent
Smith et al.

(10) Patent No.: US 11,326,973 B2
(45) Date of Patent: May 10, 2022

(54) METHOD FOR MEASURING COMBINE HEADER CENTER OF GRAVITY AND MASS

(71) Applicant: CNH Industrial America LLC, New Holland, PA (US)

(72) Inventors: Brent Smith, Lititz, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 183 days.

(21) Appl. No.: 16/552,212

(22) Filed: Aug. 27, 2019

(65) Prior Publication Data

US 2021/0063265 A1   Mar. 4, 2021

(51) Int. Cl.
| | |
|---|---|
| *A01B 63/00* | (2006.01) |
| *G01M 1/12* | (2006.01) |
| *A01B 63/108* | (2006.01) |
| *A01D 41/127* | (2006.01) |
| *G01G 19/02* | (2006.01) |
| *A01D 41/14* | (2006.01) |

(52) U.S. Cl.
CPC .......... *G01M 1/122* (2013.01); *A01B 63/108* (2013.01); *A01D 41/127* (2013.01); *G01G 19/02* (2013.01); *A01D 41/141* (2013.01)

(58) Field of Classification Search
CPC .......... G05D 1/0278; G05D 2201/0201; A01B 69/004; A01D 41/127
See application file for complete search history.

(56) References Cited

U.S. PATENT DOCUMENTS

| | | | |
|---|---|---|---|
| 7,748,489 B2 | 7/2010 | Sheidler et al. | |
| 9,152,938 B2 | 10/2015 | Lang et al. | |
| 9,309,057 B2 * | 4/2016 | Juelke | A01D 75/287 |

(Continued)

FOREIGN PATENT DOCUMENTS

| | | |
|---|---|---|
| AU | 2017203232 A1 | 1/2018 |
| EP | 2695511 A1 | 2/2014 |

(Continued)

OTHER PUBLICATIONS

Extended European Search Report for EP Application No. 20192730.8 dated Feb. 8, 2021 (four pages).

*Primary Examiner* — Brandi N Hopkins
(74) *Attorney, Agent, or Firm* — Peter Zacharias; Patrick Sheldrake (57) ABSTRACT

An agricultural combine having a chassis, an intermediate member connected to the chassis, a first actuator connecting the chassis to the intermediate member, a first gauge configured to measure a first force generated by the first actuator, a header movably connected to the intermediate member, a second actuator connecting the header to the intermediate member, a second gauge configured to measure a second force generated by the second actuator, and a processing unit operatively connected to the first gauge and to the second gauge and comprising a processor and a memory, the memory storing computer readable instructions that, when executed by the processor, are configured to evaluate the first force and the second force to determine a position of a center of gravity of the header relative to the chassis. A method for determining the position of the center of gravity and weight of the header are also provided.

17 Claims, 3 Drawing Sheets

(56) References Cited

U.S. PATENT DOCUMENTS

| | | | |
|---|---|---|---|
| 9,807,926 B2 | 11/2017 | Wilken et al. | |
| 9,961,835 B2 * | 5/2018 | Lauwers | A01D 61/004 |
| 2015/0334920 A1 * | 11/2015 | Schleicher | G05D 1/021 |
| | | | 701/41 |
| 2018/0359920 A1 | 12/2018 | Dunn et al. | |
| 2019/0327893 A1 * | 10/2019 | Hamilton | A01D 78/001 |

FOREIGN PATENT DOCUMENTS

| | | |
|---|---|---|
| WO | 00/34060 A1 | 6/2000 |
| WO | 2018152266 A1 | 8/2018 |

\* cited by examiner

METHOD FOR MEASURING COMBINE HEADER CENTER OF GRAVITY AND MASS

BACKGROUND OF THE INVENTION

Agricultural combines typically include a header that is movably attached to the chassis of the vehicle by a feeder housing. During operation, the header might be raised or lowered to account for variations in the ground level, properties of the particular crop being harvested, and various other operating conditions. The header can represent a substantial portion of the combine's total weight. As such, the header is often modeled in the vehicle control system—such as an automatic header height control system—as a pendulum suspended at the front of the combine. The automatic header height control system uses the header model to establish expected dynamic response properties and an oscillation frequency of the header to help control the position of the header during operation.

In some cases, the dynamic model of the header can remain essentially fixed, such as when a header is always used in the same configuration on the same vehicle. However, the header can be modified for different uses, and different headers (e.g., wider or narrow headers or headers configured for different crop types) can often be mounted onto the same vehicle at different times. When such changes are made, or when a new header is fitted to a combine vehicle, a process may be used to estimate the header mass. For example, the header lift actuators may be activated to raise the header above the ground, and the resulting hydraulic pressure required to lift the header is measured. This pressure can be converted into a force measurement, and the force on the actuator can be converted to a vertical force representing the estimated weight of the header.

While helpful, this process is somewhat deficient because the weight estimate requires one to either know or assume the position of the center of gravity of the header. For example, a header that requires a particular force to raise off the ground could be a relatively light header having a center of gravity positioned relatively far from the feeder housing, or a relatively heavy header having a center of gravity positioned relatively close to the feeder housing.

The inventors have determined that the state of the art still requires further advancement, particularly in regard to providing more accurate measurements of header mass and center of gravity.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural combine having a chassis configured for movement on a surface, an intermediate member movably connected to the chassis, and a header movably connected to the intermediate member. A first actuator connects the chassis to the intermediate member and is configured to move the intermediate member relative to the chassis. A first gauge is configured to measure a first force generated by the first actuator. A second actuator connects the header to the intermediate member and is configured to move the header relative to the intermediate member. A second gauge configured to measure a second force generated by the second actuator. A processing unit is operatively connected to the first gauge and to the second gauge and includes a processor and a memory. The memory stores computer readable instructions that, when executed by the processor, are configured to evaluate the first force and the second force to determine a position of a center of gravity of the header relative to the chassis.

In some aspects, the computer readable instructions, when executed by the processor, are configured to evaluate the first force and the second force to determine a mass of the header.

In some aspects, the first actuator comprises a first hydraulic cylinder and the first gauge comprises a first pressure sensor configured to measure a first pressure of a first volume of liquid in the first hydraulic cylinder, and the second actuator comprises a second hydraulic cylinder and the second gauge comprises a second pressure sensor configured to measure a second pressure of a second volume of liquid in the second hydraulic cylinder. The computer readable instructions, when executed by the processor, may be configured to determine the first force as a function of the first pressure, and to determine the second force as a function of the second pressure.

In some aspects, the processor is configured to determine the position of the center of gravity of the header relative to the chassis by comparing the first force and the second force to a plurality of known geometric relationships of the intermediate member and the header. The intermediate member may be connected to the chassis at a first pivot connection, the first actuator may be connected to the intermediate member at a first actuator connection point, the header may be connected to the intermediate member at a second pivot connection, and the second actuator may be connected to the header at a second actuator connection point. The known geometric relations may include: a first distance between the first pivot connection and the second pivot connection, a second distance between the first pivot connection and the first actuator connection point, and a third distance between the second pivot connection and the second actuator connection point.

In some aspects, the processor is configured to determine the position of the center of gravity of the header relative to the chassis by comparing the first force and the second force to a lookup table comprising a plurality of predetermined center of gravity positions stored as functions of respective values of the first force and the second force.

In some aspects, the intermediate member comprises a feeder housing.

In another exemplary aspect, there is provided a method for determining a center of gravity of a header that is movably connected to a chassis of the agricultural vehicle by an intermediate member. The method includes: measuring a first force required to hold the intermediate member at a first position relative to the chassis; measuring a second force required to hold the header at a second position relative to the intermediate member; and comparing the first force and the second force to a plurality of known geometric relationships of the intermediate member and the header to determine a position of a center of gravity of the header relative to the chassis.

In some aspects, the method includes comparing the first force and the second force to the plurality of known geometric relationships of the intermediate member and the header to determine a mass of the header. The first force may be a force calculated from a pressure of a first volume of liquid in a first actuator configured to move the intermediate member relative to the chassis, and the second force may be a force calculated from a pressure of a second volume of liquid in a second actuator configured to move the header relative to the intermediate member. The intermediate member may be pivotally connected to the chassis to rotate about a first pivot connection, the first force may be applied to the intermediate member at a first point, the header may be pivotally connected to the intermediate member to rotate about a second pivot connection, and the second force may be applied to the intermediate member at a second point. The known geometric relationships may include: a first distance between the first pivot connection and the second pivot connection, a second distance between the first pivot connection and the first point, and a third distance between the second pivot connection and the second point. Comparing the first force and the second force to the plurality of known geometric relationships of the intermediate member and the header to determine the position of the center of gravity of the header relative to the chassis may include actively calculating the position of the center of gravity based on one or more predetermined equations. Comparing the first force and the second force to the plurality of known geometric relationships of the intermediate member and the header to determine the position of the center of gravity of the header relative to the chassis comprises comparing the first force and the second force to a lookup table comprising a plurality of predetermined center of gravity positions stored as functions of respective values of the first force and the second force.

In some aspects of the method, the agricultural vehicle comprises a combine, and the intermediate member comprises a feeder housing.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide methods and apparatus for determining the position of the center of gravity and/or weight of a header attached to an agricultural combine or other equipment. It will be appreciated that other embodiments may be used in other type of machine having a similar arrangement of parts, upon incorporation of the appropriate features of the inventions herein.

Figure 1:
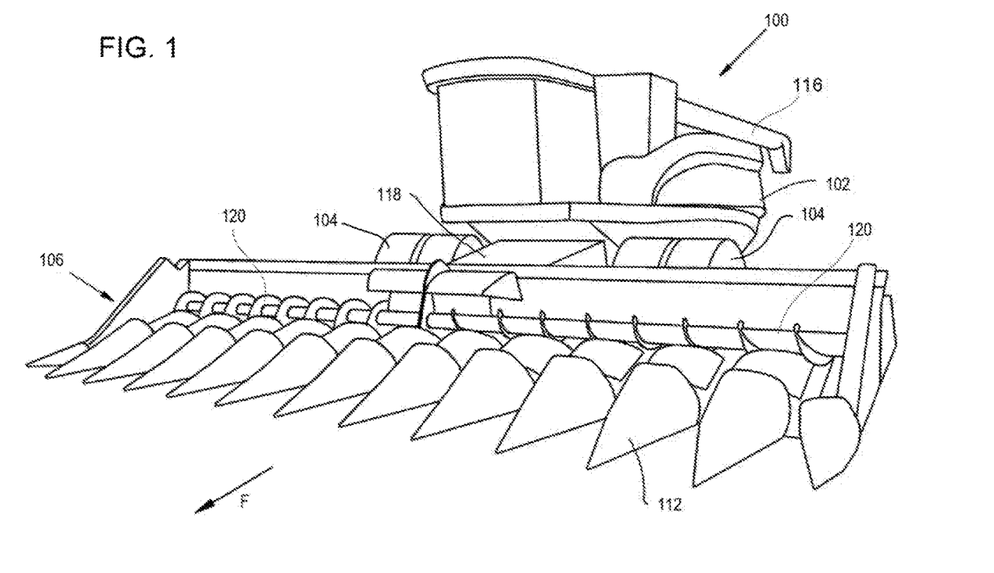
FIG. 1 illustrates an example of an agricultural combine having a header.
Figure 2:
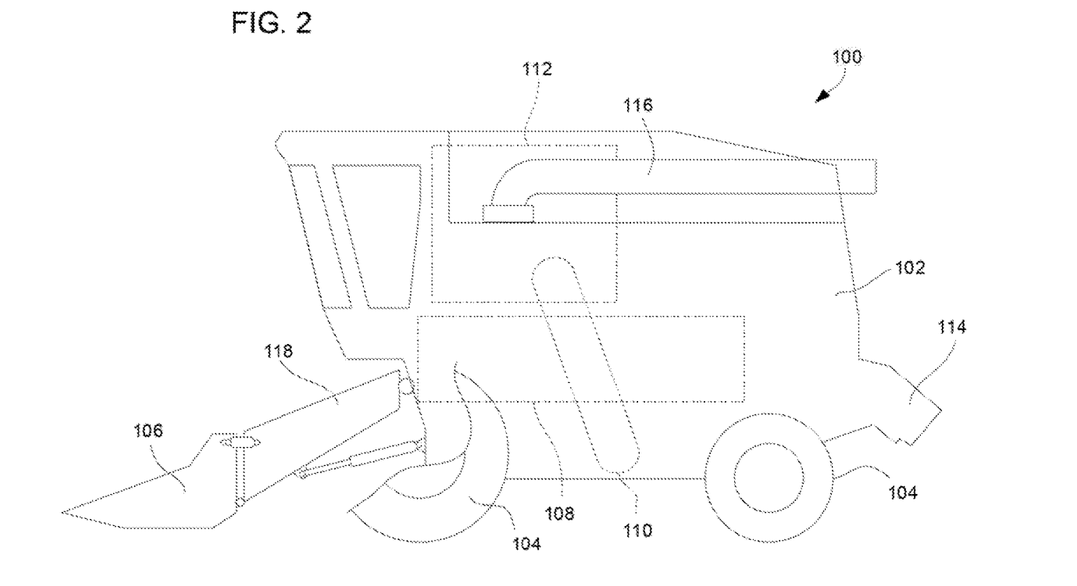
FIG. 2 is a schematic side view of the example of FIG. 1.

FIGS. 1 and 2, illustrate an example of an agricultural combine 100. The combine 100 has a chassis 102 that is supported for movement on the ground by wheels 104 or tracks. A header 106 is attached to the combine 100 and configured to receive crop material and covey such material to a threshing and separating system 108 located in or on the chassis 102. The threshing and separating system 108 separates grain from the remaining crop material (also known as "material other than grain" or "MoG") and a grain elevator 110 conveys the grain to a grain hopper 112. The MoG is discharged from the back of the combine through one or more openings, which may include a spreader 114 to better distribute the MoG on the ground. An unloader 116, such as a movable conduit having an auger or unloading belt may be provided to remove the grain from the hopper 112. The header 106 is movably connected to the chassis 102 by an intermediate member 118, such as a feeder housing 118. The header 106 may comprise any variety of crop processing equipment, such as crop reels (not shown), cutters, crop dividers 112, augers 120 or belts to move crop material towards the feeder housing, or the like. The feeder housing 118 typically includes belt or chain driven slats or paddles to project the crop materials back to the chassis 102. In use, the combine 100 is driven in a forward direction F with the header 106 in proximity to the ground to process the crop material in front of the combine 100. The operation and construction of the foregoing components of the combine 100 are well-known in the art and need not be described in greater detail herein.

Figure 3:
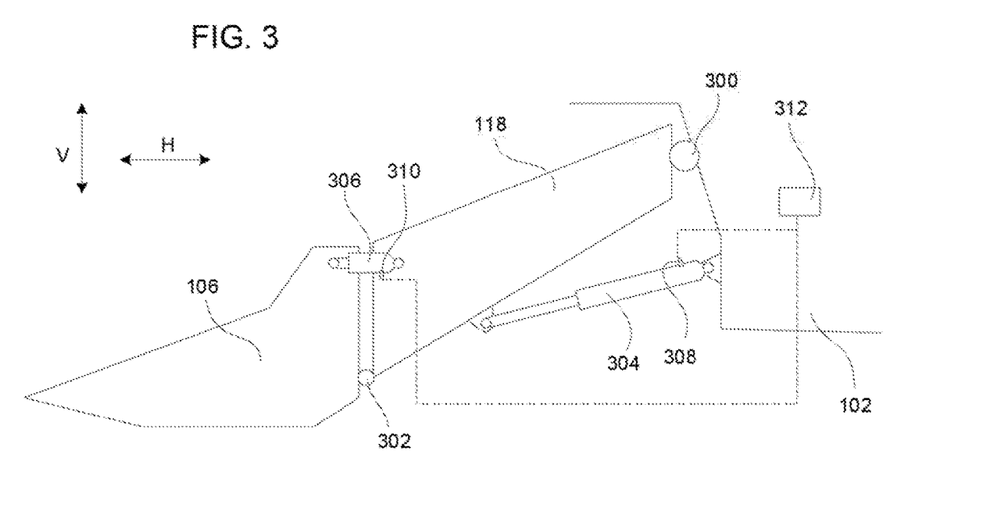
FIG. 3 is a detailed schematic side view of the example of FIG. 1

FIG. 3 shows the connection between the chassis 102 and the header 106 in more detail. The feeder housing 118 is movably connected to the chassis 102 at a first movable connection, such as a first pivot connection 300, and the header 106 is movably connected to the feeder housing 118 at a second movable connection, such as a second pivot connection 302. The pivot connections 300, 302 may comprise any suitable arrangement of pivot pin connectors or the like. Alternatively, one or both movable connections may be provided to the form of linkage arms or other connectors that allow pivoting, rotational, parallel traversing, sliding, or other relative motion between the parts.

A first actuator 304 is provided to control motion (in this case, pivoting motion) of the feeder housing 118 relative to the chassis 102. The first actuator 304 may comprise, for example, a conventional feeder housing lift cylinder or the like. A second actuator 306 is provided to control motion (again, pivoting motion) of the header 106 relative to the feeder housing 118. The second actuator 306 is provided to tilt the header 106 forwards and backwards relative to the feeder housing 118, and may be provided along with the second pivot connection 302 as a faceplate connector between the header 106 and feeder housing 118. The rotation axes of the first pivot connection 300 and second pivot connection 302 preferably are parallel.

Each of the first and second actuators 304, 306 may comprise any suitable mechanism. In this example, the first actuator 304 and the second actuator 306 each comprises one or more telescoping hydraulic piston and cylinder assemblies, which are operatively connected via hydraulic lines to a source of pressurized hydraulic fluid and valves appropriate to provide the desired motion control. It will be appreciated that the term "actuator" is intended to cover a single mechanism or plural mechanisms operated together to achieve the desired motion control.

Each actuator 304, 306 has an associated gauge to determine the force being generated by the actuator 304, 306. In this case, a first pressure transducer 308 is provided to measure the pressure of a first volume of hydraulic fluid in a cylinder of the first actuator 304, and a second pressure transducer 310 is provided to measure the pressure of a second volume of hydraulic fluid in a cylinder of the second actuator 306. The pressure transducers 308, 310 each provide a respective electric signal that is proportional to the amount of pressure within the respective cylinder. The electric signals are calibrated to indicate internal pressure values, and the internal pressure values can be converted to respective operating forces by multiplying the pressure by the effective area of the associated piston. The force values can alternatively be determined based on a calibration between the output signals and empirically-determined force values, or by other methods as known in the art.

The pressure transducers 308, 310 (or other force gauges as might be used) are operatively connected via wires or wireless communication to a processing unit 312. The processing unit (an example of which is described in more detail subsequently herein) is configured to evaluate the output of the pressure transducers 308, 310 to determine the weight of the header 106, and a position of the center of gravity of the header 106 relative to the chassis 102.

Figure 4:
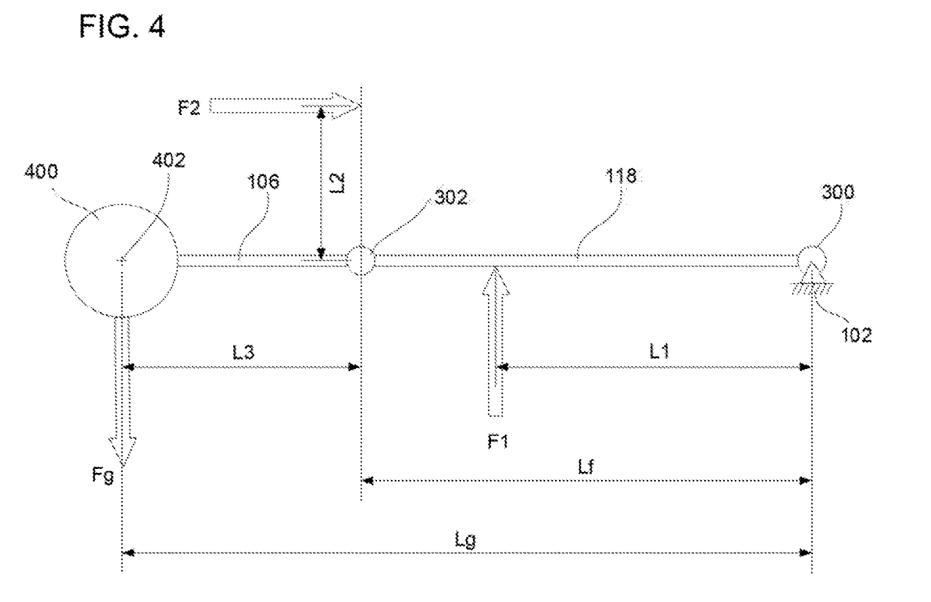
FIG. 4 is a free body diagram illustrating a method for determining the weight and position of the center of gravity of a header.

One method for determining the weight and position of the center of gravity is illustrated in FIG. 4, which is a free body diagram of the header 106, feeder housing 118 and actuator system. For simplicity, the diagram is illustrated to resolve the forces and distances into their horizontal and vertical components. The horizontal axis H and vertical axis V are illustrated in FIG. 3.

When the feeder housing 118 is raised to hold the header 106 at a stationary position above the ground, the rotation forces (i.e., moments) about the first pivot connection 300 and second pivot connection 302 are balanced and equal to zero. A first actuator force F1 generated by the first actuator 304 acts on the feeder housing 118 at a location between the first pivot connection 300 and the second pivot connection 302. In practice, the first actuator 304 generates a vector force oriented along the sliding axis of the first actuator 304, but the magnitude of this force can be converted to an equivalent first actuator force F1 located at a first equivalent distance L1 from the first pivot connection 300 based on the known geometric configuration of the feeder housing 118 and first actuator 304. With the parts in equilibrium, the moment about the first pivot connection 300 generated by the first actuator force F1 at the first equivalent distance L1 is equal and opposite the moment generated by the weight Fg (i.e., mass gravity force) of the header 106 at the distance Lg of the header's center of gravity 402 from the first pivot connection 300. Thus, with the parts in equilibrium the following mathematical relation is satisfied:

$$F1*L1=Fg*Lg \quad \text{(Equation 1)}$$

Similarly, a second actuator force F2 generated by the second actuator 306 acts between the header 106 and the feeder housing 118 to hold the header 106 at a fixed position relative to the feeder housing 118. In practice, the second actuator 306 generates a vector force oriented along the sliding axis of the second actuator 306, but the magnitude of this force can be converted into an equivalent second actuator force F2 located at an equivalent second distance L2 from the second pivot connection 302 based on the known geometric configuration of the header 106 and the second actuator 306. With the parts in equilibrium, the moment about the second pivot connection 302 generated by the second actuator force F2 at the second equivalent distance L2 is equal and opposite to the weight Fg of the header 106 at a third distance L3 as measured from the second pivot connection to the center of gravity 402 of the header 106. This third distance L3 is equal to the distance Lg from the first pivot connection 300 to the header center of gravity 400, minus the horizontal distance Lf from the first pivot connection 300 to the second pivot connection 302 (i.e., L3=Lg-Lf). Thus, with the parts in equilibrium the following mathematical relation is satisfied:

$$F2*L2=Fg*(Lg-Lf) \quad \text{(Equation 2)}$$

It will be appreciated from the foregoing that the system illustrated in FIG. 4 can be defined according to two equations, and therefore the two equations can be used to solve for up to two unknown values. In this case, the unknown values are the distance to the header center of gravity Lg, and the weight Fg of the header 106. The foregoing equations can be solved for both unknowns, resulting in the following equations:

$$Fg=(F1*L1-F2*L2)/Lf \quad \text{(Equation 3)}$$

$$Lg=(F1*L1)/Fg \quad \text{(Equation 4)}$$

It will be appreciated that some of the variables, such as the horizontal distance Lf between the first connection 300 and the second pivot connection 302, can vary depending on the geometric configuration of the parts. Such variations can be accounted for by including appropriate correction factors, performing the measurement at predetermined geometric positions, measuring the value during each evaluation to determine center of gravity and mass, and so on.

It will also be appreciated that the foregoing method provides only the horizontal position of the header center of gravity distance Lg. It is expected that this is sufficient for most or all applications to determine the appropriate dynamic model and oscillation frequency of the header 106. However, it also may be possible to evaluate or estimate the vertical position of the center of gravity by taking additional force measurements with the parts in different relative orientations. For example, the second actuator 306 may be operated to move the header 106 to multiple angular positions relative to the feeder housing 118 to provide an indication of how far the center of gravity moves in the horizontal plane as a function of such rotation, which can be used to evaluate or estimate a vector position in the horizontal and vertical directions of the center of gravity relative to the second pivot connection 302.

The foregoing embodiment provides control of the feeder housing 118 and header 106 positions by using hydraulic actuators, and measurement of the cylinder pressures, and thus the forces exerted by the actuators, using hydraulic pressure transducers. However, the first and second actuators 304, 306 alternatively may comprise electric motors or other suitable devices to move the parts relative to one another, and the pressure sensors 308, 310 may be replaced by other mechanisms to detect force, such as strain gauges, mechanical scales, and the like. Other alternatives and variations will be apparent to persons of ordinary skill in the art in view of the present disclosure.

Figure 5:
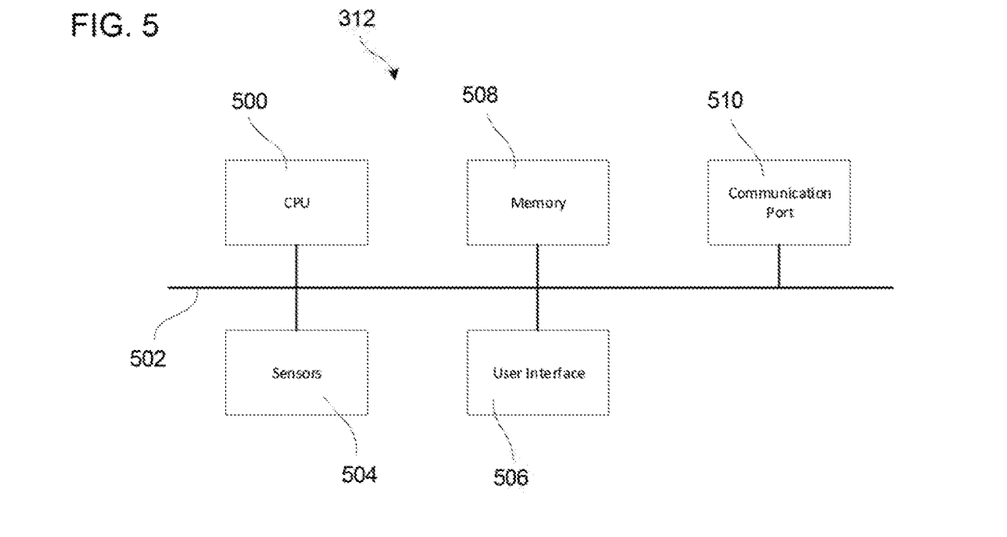
FIG. 5 schematically illustrates an exemplary control unit for determining the weight and position of the center of gravity of a header.

FIG. 5 schematically illustrates a processing unit 312 configured to evaluate the position of the center of gravity and weight of a header 106, but it will be appreciated that both of these functions are not necessarily required. For example, embodiments may be configured to calculate only the position of the header's center of gravity relative to the chassis 102, or only the weight of the header 106. The processing unit 312 generally includes any suitable arrangement of processors and logical circuits, hardware and programming code effective to perform and present the desired calculations. Here, the exemplary processing unit 312 comprises a central processing unit (CPU) 500, which is responsible for performing calculations and logic operations required to execute one or more computer programs or operations. The CPU 500 is connected via a data transmission bus 502 to sensors 504 (e.g., pressure transducers 308 and 310), a user interface 506, and a memory 508. The user interface 506 may comprise any suitable connection port or the like for programming and customizing the operation of the processing unit 312. The processing unit 312 also may have a communication port 510 that is operatively connected (wired or wirelessly) to other combine control systems such as the actuators 304, 306 for transmitting control signals to place the actuators 304, 306 into the desired position or positions for collecting data from the pressure transducers 308, 310. One or more analog to digital conversion circuits may be provided to convert analog data from the sensors 308, 310 to an appropriate digital signal for processing by the CPU 500, as known in the art.

The CPU 500, data transmission bus 502 and memory 508 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other memory (e.g., compact disk, digital disk, solid state drive, flash memory, memory card, USB drive, optical disc storage, etc.). The selection of an appropriate processing system and memory is a matter of routine practice and need not be discussed in greater detail herein.

The memory 508 stores computer readable instructions that are loaded and executed by the CPU 500 to obtain sensor data from the sensors 308, 310, and determine the position Lg of the header's center of gravity, and the weight Fg of the header 106. Such instructions are non-transiently stored on a tangible computer readable medium, such as on a magnetic medium, e.g., a computer hard drive, an optical medium, e.g., an optical disc, solid-state memory, e.g., flash memory, or other storage media known in the art. The instructions may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. The instructions also may be stored or accessible in a human-understandable form, e.g., a script, that may be executed on the fly with the aid of an interpreter executed by a computer's central processing unit or by a controller.

Figure 6:
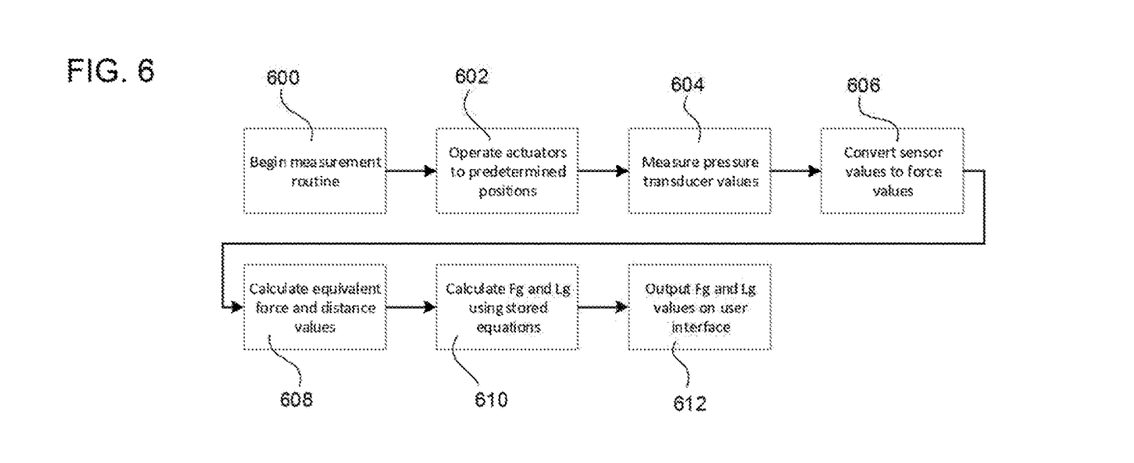
FIG. 6 is an exemplary process for determining the weight and position of the center of gravity of a header.

It is envisioned that the computer readable instructions may be configured to perform the process of determining the position Lg of the header's center of gravity and the weight Fg of the header using any of a variety of operations. One example is shown in FIG. 6. Here, the process begins at step 600 by a user activating a measurement routine. Next, in step 602, the processing unit 312 operates the actuators 304, 306 to place the feeder housing 118 and header 106 into a predetermined physical relationship relative to the chassis 102. Such positions may be selected to provide consistent results without requiring detailed reevaluation of the geometric relationships of the parts during the measurement process. For example, the predetermined positions may be to retract the face plate actuator 306 to a particular angle (e.g., full stop against the feeder housing 118), and raise the feeder housing 118 until the force on the feeder housing actuator 306 exceeds a predetermined threshold value known through empirical testing to indicate that the header 106 is lifted completely off the ground. Such positions also may be determined and achieved using position sensors (e.g., potentiometers or the like).

In step 604, the processing unit 312 measures the values sensed by the pressure transducers 308, 310. Such values may be provided, for example, in the form of raw or processed voltage signals. In step 606, the processing unit 312 converts the sensor data into respective force values, such as by applying a known relationship between the fluid pressure within the respective cylinder and the voltage value output by the sensor, and multiply the pressure value with the effective area of the piston to determine a force load. Alternatively, in other exemplary embodiments, the determination of force values in step 606 may be done by comparing the sensor signal to a stored lookup table of pre-established force values corresponding to the sensor output signal magnitude, or by performing other logical processes. In step 608, the processing unit 312 converts the force values into equivalent force and distance values, and in step 610 the processing unit 312 applies the equations above (or comparable equations) to actively calculate the weight Fg of the header 106, and the distance Lf in the horizontal direction H from the chassis 102 to the header's center of gravity. Finally, in step 612, the processing unit 312 presents the calculated values to an operator via a user interface, such as a computer screen, digital display, or the like.

The foregoing process may be modified in various ways. For example, step 602 may be omitted and replaced by the user manually operating the actuators to predetermined positions, or the process may be performed without regard to the positions of the actuators on the assumption that the values returned will be sufficiently accurate regardless of how the feeder housing 118 and header 106 are oriented at the time of measurement.

In another embodiment, the process may be simplified by omitting the converting and calculating steps (steps 606 through 610), and replacing them with a procedure in which the measured pressure transducer values are compared to a lookup table stored in the memory 508. The stored lookup table can include, for example, predetermined values for the center of gravity position Lg and/or header weight Fg as a function of the values of the first force F1 and the second force F2.

It will be appreciated from the present disclosure that the invention provides a new and useful way to measure the position of the header's center of gravity, and the weight of the header. The systems and processes described herein can be used to perform rapid determinations of these properties upon modifying or replacing a header, and such information can be used to tune the header control system to account for the different dynamic properties and oscillation frequencies of each individual header that is attached to the combine.

The foregoing embodiments provide examples of how force measurements can be used to evaluate the position of the header's center of gravity and the header's weight. Such force measurements are implemented in the examples in conjunction with a header 106 that connected to the chassis 102 by a first articulated connection in the form of a pivot between the feeder housing 118 and the chassis 102, and a second articulated connection in the form of a pivot between the header 106 and the feeder housing 118. However, it will be appreciated that implementations and embodiments may use alternative physical connections between the various parts, alternative force measuring gauges, and alternative mechanisms for controlling the positions of the parts. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural combine comprising:
a chassis configured for movement on a surface;
an intermediate member movably connected to the chassis;
a first actuator connecting the chassis to the intermediate member and configured to move the intermediate member relative to the chassis;
a first gauge configured to measure a first force generated by the first actuator;
a header movably connected to the intermediate member;
a second actuator connecting the header to the intermediate member and configured to move the header relative to the intermediate member;
a second gauge configured to measure a second force generated by the second actuator; and
a processing unit operatively connected to the first gauge and to the second gauge and comprising a processor and a memory, the memory storing computer readable instructions that, when executed by the processor, are configured to evaluate the first force and the second force to determine a position of a center of gravity of the header relative to the chassis.

2. The agricultural combine of claim 1, wherein the computer readable instructions, when executed by the processor, are configured to evaluate the first force and the second force to determine a mass of the header.

3. The agricultural combine of claim 1, wherein:
the first actuator comprises a first hydraulic cylinder and the first gauge comprises a first pressure sensor configured to measure a first pressure of a first volume of liquid in the first hydraulic cylinder; and
the second actuator comprises a second hydraulic cylinder and the second gauge comprises a second pressure sensor configured to measure a second pressure of a second volume of liquid in the second hydraulic cylinder.

4. The agricultural combine of claim 3, wherein the computer readable instructions, when executed by the processor, are configured to determine the first force as a function of the first pressure, and to determine the second force as a function of the second pressure.

5. The agricultural combine of claim 1, wherein the processor is configured to determine the position of the center of gravity of the header relative to the chassis by comparing the first force and the second force to a plurality of known geometric relationships of the intermediate member and the header.

6. The agricultural combine of claim 5, wherein:
the intermediate member is connected to the chassis at a first pivot connection;
the first actuator is connected to the intermediate member at a first actuator connection point;
the header is connected to the intermediate member at a second pivot connection; and
the second actuator is connected to the header at a second actuator connection point.

7. The agricultural combine of claim 6, wherein the plurality of known geometric relations comprises:
a first distance between the first pivot connection and the second pivot connection,
a second distance between the first pivot connection and the first actuator connection point, and
a third distance between the second pivot connection and the second actuator connection point.

8. The agricultural combine of claim 1, wherein the processor is configured to determine the position of the center of gravity of the header relative to the chassis by comparing the first force and the second force to a lookup table comprising a plurality of predetermined center of gravity positions stored as functions of respective values of the first force and the second force.

9. The agricultural combine of claim 1, wherein the intermediate member comprises a feeder housing.

10. A method for determining a center of gravity of a header that is movably connected to a chassis of an agricultural vehicle by an intermediate member, the method comprising:
measuring a first force required to hold the intermediate member at a first position relative to the chassis;
measuring a second force required to hold the header at a second position relative to the intermediate member; and
comparing the first force and the second force to a plurality of known geometric relationships of the intermediate member and the header to determine a position of a center of gravity of the header relative to the chassis.

11. The method of claim 10, further comprising comparing the first force and the second force to the plurality of known geometric relationships of the intermediate member and the header to determine a mass of the header.

12. The method of claim 10, wherein:
the first force comprises a force calculated from a pressure of a first volume of liquid in a first actuator configured to move the intermediate member relative to the chassis; and
the second force comprises a force calculated from a pressure of a second volume of liquid in a second actuator configured to move the header relative to the intermediate member.

13. The method of claim 10, wherein:
the intermediate member is pivotally connected to the chassis to rotate about a first pivot connection;
the first force is applied to the intermediate member at a first point;
the header is pivotally connected to the intermediate member to rotate about a second pivot connection; and
the second force is applied to the intermediate member at a second point.

14. The method of claim 13, wherein the plurality of known geometric relationships comprises:
a first distance between the first pivot connection and the second pivot connection,
a second distance between the first pivot connection and the first point, and
a third distance between the second pivot connection and the second point.

15. The method of claim 14, wherein comparing the first force and the second force to the plurality of known geometric relationships of the intermediate member and the header to determine the position of the center of gravity of the header relative to the chassis comprises actively calculating the position of the center of gravity based on one or more predetermined equations.

16. The method of claim 14, wherein comparing the first force and the second force to the plurality of known geometric relationships of the intermediate member and the header to determine the position of the center of gravity of the header relative to the chassis comprises comparing the first force and the second force to a lookup table comprising a plurality of predetermined center of gravity positions stored as functions of respective values of the first force and the second force.

17. The method of claim 10, wherein the agricultural vehicle comprises a combine, and the intermediate member comprises a feeder housing.

\* \* \* \* \*